US012284187B1

(12) United States Patent
Shipley et al.

(10) Patent No.: US 12,284,187 B1
(45) Date of Patent: Apr. 22, 2025

(54) MICROPATTERN DETECTION-BASED VIDEO AUTHENTICATION METHOD AND SYSTEM

(71) Applicant: UIPCO, LLC, San Antonio, TX (US)

(72) Inventors: Brian Francisco Shipley, Plano, TX (US); Brian Tougas, Spring Branch, TX (US); Gideon Bowie Luck, Wylie, TX (US); Sean Carl Mitchem, San Antonio, TX (US); Christopher Russell, The Colony, TX (US); Andre Rene Buentello, San Antonio, TX (US); Jose L. Romero, Jr., San Antonio, TX (US); David Joaquin Harris, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 268 days.

(21) Appl. No.: 18/160,531

(22) Filed: Jan. 27, 2023

Related U.S. Application Data

(60) Provisional application No. 63/267,245, filed on Jan. 28, 2022.

(51) Int. Cl.
*H04L 9/40* (2022.01)
(52) U.S. Cl.
CPC ........ *H04L 63/102* (2013.01); *H04L 63/0861* (2013.01)
(58) Field of Classification Search
CPC .......................... H04L 63/102; H04L 63/0861
See application file for complete search history.

(56) References Cited

U.S. PATENT DOCUMENTS

| | | | | |
|---|---|---|---|---|
| 9,985,786 | B1* | 5/2018 | Bhabbur | G06F 3/0488 |
| 11,256,792 | B2* | 2/2022 | Tussy | G06V 40/70 |
| 11,704,398 | B1* | 7/2023 | Tougas | H04L 51/02 |
| | | | | 726/9 |
| 2014/0043280 | A1* | 2/2014 | Cok | G06F 3/0443 |
| | | | | 345/173 |
| 2019/0086787 | A1* | 3/2019 | Urey | G02B 27/0101 |
| 2019/0232708 | A1* | 8/2019 | Holmes | B42D 25/45 |
| 2020/0042685 | A1* | 2/2020 | Tussy | G06V 40/50 |
| 2020/0218886 | A1* | 7/2020 | Sheets | G06V 40/172 |
| 2024/0348603 | A1* | 10/2024 | Tussy | G06F 21/32 |

* cited by examiner

*Primary Examiner* — J. Brant Murphy
(74) *Attorney, Agent, or Firm* — Plumsea Law Group, LLC

(57) ABSTRACT

A micropattern detection-based method and system of performing an authentication of video of a person in order to authorize access to a secured resource is provided. The user provides image data in which they present a secondary computing device with a specially fabricated screen cover. The screen cover includes a plurality of micro-holes that collectively provide a unique micropattern. When the user adjusts a display setting, the micropattern, previously cloaked, becomes apparent as an arrangement of pinpoints of light. The system and method are configured to evaluate the image data to determine whether the micropattern is present. If a micropattern is present, the system determines the image is authentic and can verify an identity of the person. In some cases, the system can further be configured to automatically grant the person access to one or more services for which they are authorized.

20 Claims, 9 Drawing Sheets

MICROPATTERN DETECTION-BASED VIDEO AUTHENTICATION METHOD AND SYSTEM

CROSS-REFERENCE TO RELATED APPLICATION

This application claims the benefit of U.S. Provisional Patent Application Ser. No. 63/267,245 filed on Jan. 28, 2022 and titled "Micropattern Detection-Based Video Authentication Method and System", the disclosure of which is incorporated by reference herein in its entirety.

TECHNICAL FIELD

The present disclosure generally relates to identity authentication, and specifically to a method and system for authentication of videos of persons seeking access to one or more secured services, features, and resources. The authentication is based on detection of a specific micropattern associated with a user's secondary device that is detected in image data captured by the user's computing device.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users. More recently, the threat of video forgery (e.g., deep fakes) have increased concern that image data of an end-user may not be authentic.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of verifying an authenticity of video in order to protect user resources is disclosed. The method includes a first step of receiving at a first time, at an authentication system and from a first computing device, a request by a first person to access a secured resource of a first user and a second step of receiving, at the authentication system, first image data captured by a camera of the first computing device when presentation of a first micropattern via a second computing device was expected to occur, the first image data also including a face of a person. The authentication system can be accessed from a remote location, and in some embodiments, reside in a cloud-based server. A third step includes determining that the first image data includes a representation of the expected first micropattern. In a fourth step, the method includes determining, in response to the first image data including a representation of the first micropattern, that the first image data includes an authentic image of the first user. Finally, a fifth step includes granting access to the secured resource for which the first user is authorized (in response to the verification) via the first computing device.

In another aspect, a system for verifying an authenticity of video in order to protect user resources includes a processor and machine-readable media. The machine-readable media include instructions which, when executed by the processor, cause the processor to receive at a first time, at an authentication system and from a first computing device, a request by a first person to access a secured resource of a first user, and to receive, at the authentication system, first image data captured by a camera of the first computing device when presentation of a first micropattern via a second computing device was expected to occur, the first image data also including a face of a person. In addition, the instructions cause the processor to determine that the first image data includes a representation of the expected first micropattern, and then to determine, in response to the first image data including a representation of the first micropattern, that the first image data includes an authentic image of the first user. Finally, the instructions cause the processor to grant access to the secured resource via the first computing device.

In another aspect, a kit of parts for enabling authentication can include a mobile computing device with a screen, and a substantially transparent first screen cover applied to the screen. The first screen cover includes a plurality of through-hole (extend from one side to the other side) micro-holes formed in a surface of the first screen cover, the plurality of micro-holes being arranged to provide a first micropattern, and the first micropattern is concealed from human vision when the screen is dark and revealed when the screen is bright.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
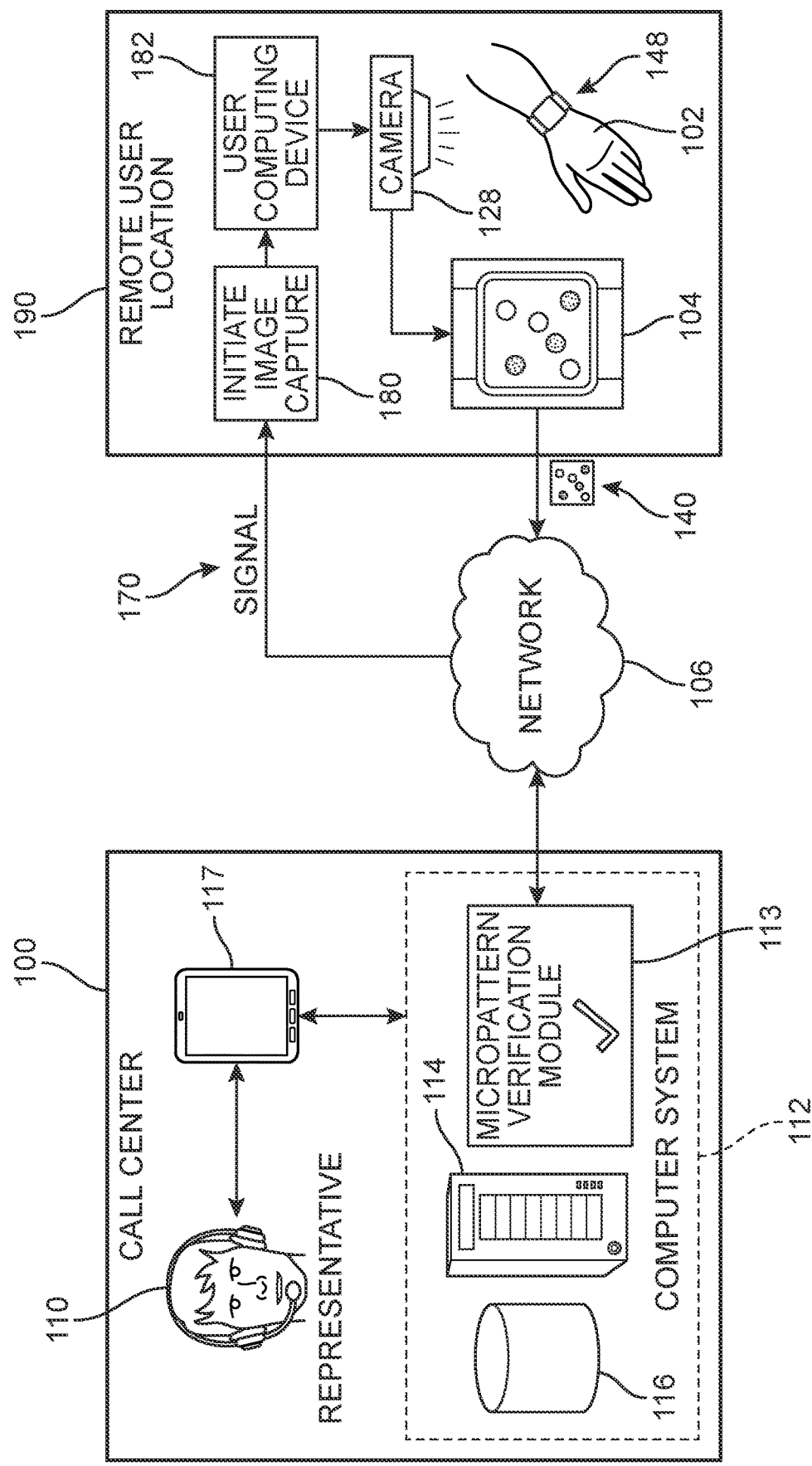
FIG. 1 is an overview of a scenario in which image data of a person wearing a secondary computing device that presents a micropattern is captured during a communication session in order to obtain access to a secured resource, according to an embodiment.

The embodiments provide a method and system of authenticating user videos and other streaming image data in a more secure and more efficient manner by detection of a patterns of light produced by a secondary computing device in the image. A pattern would appear as a result of a specially fabricated display cover for the secondary computing device. The cover would include a plurality of micro-holes that are cloaked or undetectable by human vision during normal use of the secondary computing device. However, the cover will reveal the micropattern when lit from behind with a nonstandard display setting. In some cases, these patterns may only be visible if a user's display is set to max brightness and/or displays a particular color. The use of micro-holes in the display cover prevents would-be attackers from learning about the patterns of holes, as the micro-holes would remain invisible when not backlit by the display.

As will be described in greater detail below, an authentication process and system based on a user's secondary device display may be utilized for reducing and in some cases eliminating the need for users to present credentials, input passwords, or otherwise offer identity tokens or factors, as well as curtail the use of video forgery to fraudulently access secured resources such as a user's private account. The proposed system takes advantage of an increasing reliance on teleconferencing and the growing availability of image sensors with computing devices in the day-to-day life of the modern consumer.

In some embodiments, the 'invisible' pattern—also referred to herein as a micropattern or cloaked token (or simply "token")—may comprise a plurality of small, pinpoint-size holes (through-hole micro-holes or micro-apertures) formed in the material of the display cover. A human eye would not normally be able to discern the presence of these micro-holes, but instead would only see what appears to be a substantially continuous, clear display screen cover. In other words, the token would be normally invisible or hidden until exposed to a particular light type or display setting from behind. When the backlight is on and above a particular brightness level, very small pinpricks of light will become apparent, forming a unique pattern that radiates outward from the screen, while the surrounding cover (the non-hole portions) remains comparatively dimmer.

The system contemplates the capture of video or images during communication sessions with a user that include this micropattern. This can occur, for example, during a video session with a customer representative. In some embodiments, initial image data of the user's secondary computing device on which the special cover has been applied is recorded, stored, and used as reference/enrollment data for future authentication sessions. In another example, the token itself represents a code that can be scanned by the system that will be used to verify the pattern. In yet another embodiment, the cover can be fabricated with a unique pattern of micro-holes. Based on the user's secondary computing device display type and size, an appropriate cover can be delivered to the user (following an in-person or other relatively higher-level authentication process) for installation on their display. A record of the user's assigned pattern for that particular device would be maintained in a database associated with the system. In some cases, the representative may manually initiate the recording of the data from the user's device. In other cases, the system could be configured to monitor the position and orientation of the secondary computing device in the video feed. When the device display is in an appropriate position and orientation, the system could send a signal to have image data captured for use by the system, either as enrollment data or for subsequent detection of the expected token. The token could then be detected by the authentication system to indicate that this is not a faked video.

In different embodiments, the features provided by such a system can be advantageous in combating the growing threat of video forgery. Deep fake algorithms in particular are becoming increasingly sophisticated. By generating a face through a deep learning neural network, such algorithms are able to replace a real face with an imposter fake face in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for lighting and video and image recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc. It should be appreciated that the proposed embodiments may also be used as a layer of security in addition to conventional methods such as the three categories described above (e.g., in addition to passwords, pins, ID card, biometric factors, etc.).

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body from one location to another, as well as more fine motor movements (e.g., adjusting the position of their arm to present a device display to the camera) are passive interactions, as the person could perform these activities regardless of the authentication system that is in place. However, other user actions, such as but not limited to providing a passcode, pre-registered security question answers, etc. are active inputs and a system requiring any of these types of information would not be considered passive. In addition, this type of arrangement—relying on the appearance of a unique micropattern—precludes the need to previously record and store any biometric data (e.g., retinal scan, fingerprint scan, voiceprint, etc.) for the user, which some users are uncomfortable doing.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood to refer to any end-user or person requesting or receiving assistance or other communications from a secured system, including via a communication session with a remote agent, whether human or virtual/artificial. The customer can typically view at least one aspect of the interaction through a display of their primary computing device.

The following systems describe a process of authentication that serves as a reliable barrier to deep fake imposter attacks. In other words, deep fakes-being dependent on images previously captured of the target accountholder taken by cameras—may appear to show the secondary device display, but would not include the cloaked micropattern unless the user intentionally triggers their manifestation by a change in the display settings for the device. The absence of the token in the image captured would alert the system to the threat of forgery.

In FIG. 1, an example of an authentication process is shown in which a first user 102 (represented by an arm), in a first location 190, is on a call with a representative 110 who is at a call center 100, or otherwise in a remote location relative to the first user 102. The first user 102 is conversing with representative 110 in order to be authenticated and then obtain access to their account or other secured resource. In different embodiments, first user 102 can participate in the communication session via a telephone or a computing device configured with a network connection and connected to a camera or other image sensor, depending on the mechanism utilized for data transmission.

In some embodiments, first user 102 may have access to a user computing device ("user device") 182 through which the communication session occurs. The device can include a tablet, a laptop, a smartphone, a desktop computer, a smart device, or similar kind of device that allows first user 102 to contact call center 100. For purposes of this example, the first customer 102 has just been connected to representative 110 and is seeking access to their account details via a laptop device that is connected to or includes a camera 128.

In different embodiments, the user device 182 can include an electronics unit comprising a plurality of different components, such as one or more of various user interface components (e.g., a touchscreen display, keyboard, mouse, microphone, camera, speaker, etc.), a user interface module, a processor, and/or a communication module. These devices may include a system including one or more processors and memory. Memory may comprise a non-transitory computer readable medium. Instructions stored within memory may be executed by the one or more processors. The user device 182 may be configured to receive and analyze data from various input sensors associated the device or data that is communicated from external components or devices to the device. In some cases, the user device 182 may also include a navigation system equipped with a GPS receiver that can receive GPS information or other receivers capable of receiving global or local positioning information. In addition, in different embodiments, the user device 182 can include one or more types of a device, module, machine, or subsystem whose purpose is to detect features that are invisible in visible light conditions, as will be discussed below.

A communication module may allow the user device 182 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the user device 182 may include a device display that can, for example, present information and various media for a product/service support software application ("app"). In some embodiments, the app is associated with the provider of the product/service for which the service representative is offering support. In some embodiments, the first user 102 can receive and send information through a user interface that may be presented on a display for the device. In some embodiments, the display may be a touchscreen, allowing the customer to interact with the user interface directly by touch. The user interface may refer to an operating system user interface or the interface of one or more software applications that may run on the user device 182. In some embodiments, the user interface can include a messaging window or other chat-space by which the service representative may send messages or other digital content. Alternatively, in some embodiments, the first user 102 can also speak with the service representative via a voice calling application on user device 182, or directly through a telephone or other external device.

In an example embodiment, customer service call center 100 includes at least one computing system 112. The term "computer system" refers to the computing resources of a single computer, the partial computing resources of a single computer, a plurality of computers communicating with one another, or a network of remote servers. In one embodiment, computing system 112 includes at least one server 114 having at least one processor.

In different embodiments, computing system 112 includes one or more computing devices (for example, a server) that may be in communication with one or more databases 116. Databases could be co-located with computing devices or could be remote databases that are accessible by computing devices over a network. Databases can include any kind of storage devices, including but not limited magnetic, optical, magneto-optical, and/or memory, including volatile memory and non-volatile memory. In an example embodiment, computing system 112 may also include or be configured with access to an access management service (see FIGS. 2A and 2B), of which a micropattern verification module ("verification module") 113 is a component. In some embodiments, the verification module may be implemented in software, hardware, or a combination thereof.

In different embodiments, while the first user 102 is communicating with representative 110, the access management system can be configured to verify an identify of a person so as to either permit or deny access to the user-identity dependent services. As used herein, the term "user" or "member" or "account holder" should be understood to refer to any end-user or person requesting or receiving assistance or other communications from a support agent or service representative. It should be understood that while the following description presents a sequence illustrating the use of the proposed systems and methods in a customer-agent dynamic, in other embodiments, the proposed systems may be utilized by a broad range of end-users, including other types of work calls and corporate calls, or other instances in which access is dependent on video interaction or a detection of video forgery is needed or desirable.

In some embodiments, representative 110 may have access to a device of computer system 112 or a device connected to computing system 112. In one embodiment, representative 110 may have access to a representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review customer records, view images, send documents and forms to a customer, provide access to a secured resource, and/or perform other tasks required to help a customer calling in to call center 100.

In some embodiments, both representative device 117 and user device 182 may be computer systems for processing and communicating information. Each device may generally include a processor, a data storage component, and a display. Each device may also include components to facilitate communication with external systems (for example, hardware and software components to enable communication over a network). In some cases, a device may include one or more input devices, such as a keyboard, mouse, and/or one or more physical buttons integrated into a case of the device. In other cases, a device may further include touchscreen controls and inputs.

In one embodiment, user device 182 could operate in a client-server relationship with one or more servers of computer system 112. For example, computer system 112 may include server 114 that communicates with user device 182, as well as other remote devices (e.g., user devices of other customers) over a network 106. The user device 182 may provide the front-end of a system that provides users with options for performing various kinds of tasks (for example, making fund transfers when the company is a bank). In some cases, user device 182 may run client software through a web browser, in which case the client software may be hosted on server 114 associated with computer system 112. In other cases, user device 182 may run client software in the form of a native software application that has been downloaded through a centralized marketplace (i.e., an "app store"). In some cases, while the client software that allows users to perform various tasks may be run on user device 182, the data may be retrieved from and stored on databases associated with computer system 112 (e.g., databases 116).

During the call between representative 110 and first user 102, the first user 102 requests access to an account or other secured resource belonging to (or otherwise accessible to) the first user. In response, in different embodiments, the remote access management system can automatically, or at the manual request of the service representative, initiate an authentication procedure, action, or task that includes a remote image capture event. As a general matter, a remote image capture event refers to the process and period during which the authentication system issues a control signal to a remote user camera device over a network, and the control signal causes the camera to capture an image.

In different embodiments, the access management system, through verification module 113, can generate one or more signals 170 that are transmitted over network 106. The signals 170 can, for example, include a camera control signal 180, as well as a request to the user device 182 to initiate an image capture at the remote user location 190 where the user computing device 182 is located. The signals 170 are received by the user device 182 and cause the camera 128 to capture image data 180. In this example, the first user 102 positions their arm toward the camera 128 in an orientation that presents a secondary computing device (here, a smartwatch 148) on their wrist to the camera lens. The resulting image data 104, comprising a digital representation of the display of the smartwatch 148, is transmitted over the network 106 to computer system 112.

In different embodiments, the camera 128 captures 'cloaked' data in the form of a micropattern 140 presented on a surface of the display of the user's secondary computing device. The micropattern 140 within the image data 104 is received by verification module 113, which extracts the display region and detects the presence of the micropattern 140. In some embodiments, the micropattern 140 is only visible when the display is at a particular brightness level, color temperature, contrast level, or other specific display configuration. As will be discussed below, the micropattern can be provided by a series of micro-holes formed in a screen cover applied to the surface of the display. Although the secondary device may be present in authentic and forged videos alike, only an authentic video would also include the micropattern 140 that is 'hidden' in the outer cover of the display and revealed when the user applies the correct display setting during the image capture.

Thus, based on the image data 104, the system will determine whether to authenticate the user for access to the secured resource. For example, the verification module 113 can process and analyze the micropattern 140 and determine whether the micropattern 140 includes the correct pattern. If the expected pattern is detected in the image data 104, the authenticity of the video or image can be verified, providing an additional layer of veracity to the user's identity. In this example, image data 104 does include the micropattern 140, and the system automatically communicates this information to the service representative. Thus, in FIG. 1, without further action or presentation of credentials by first user 102, the communication session can proceed with permitting first user 102 access to the account linked to the authenticated identity of the first user 102. The first user 102 is then able to make account requests and/or receive sensitive account information.

While in some embodiments the system may incorporate additional layers of authentication that may supplement the authentication process, such as facial recognition, voice recognition, fingerprint recognition, password or pin-code verification, or other such factors, it may be appreciated that the system can be readily implemented without such additional steps. In other words, the first user 102 is able to obtain access to the desired secured resources without an identification card, debit card, or other system-provided token typically presented for such occasions. The system thereby allows the user to be passively (i.e., 'touchlessly') authenticated. In some embodiments, the system is further configured to automatically provide the user with access to the secured service linked to the user's unique account, in response to the authentication that is performed based only or primarily on the capture of the micropattern.

Figure 2:
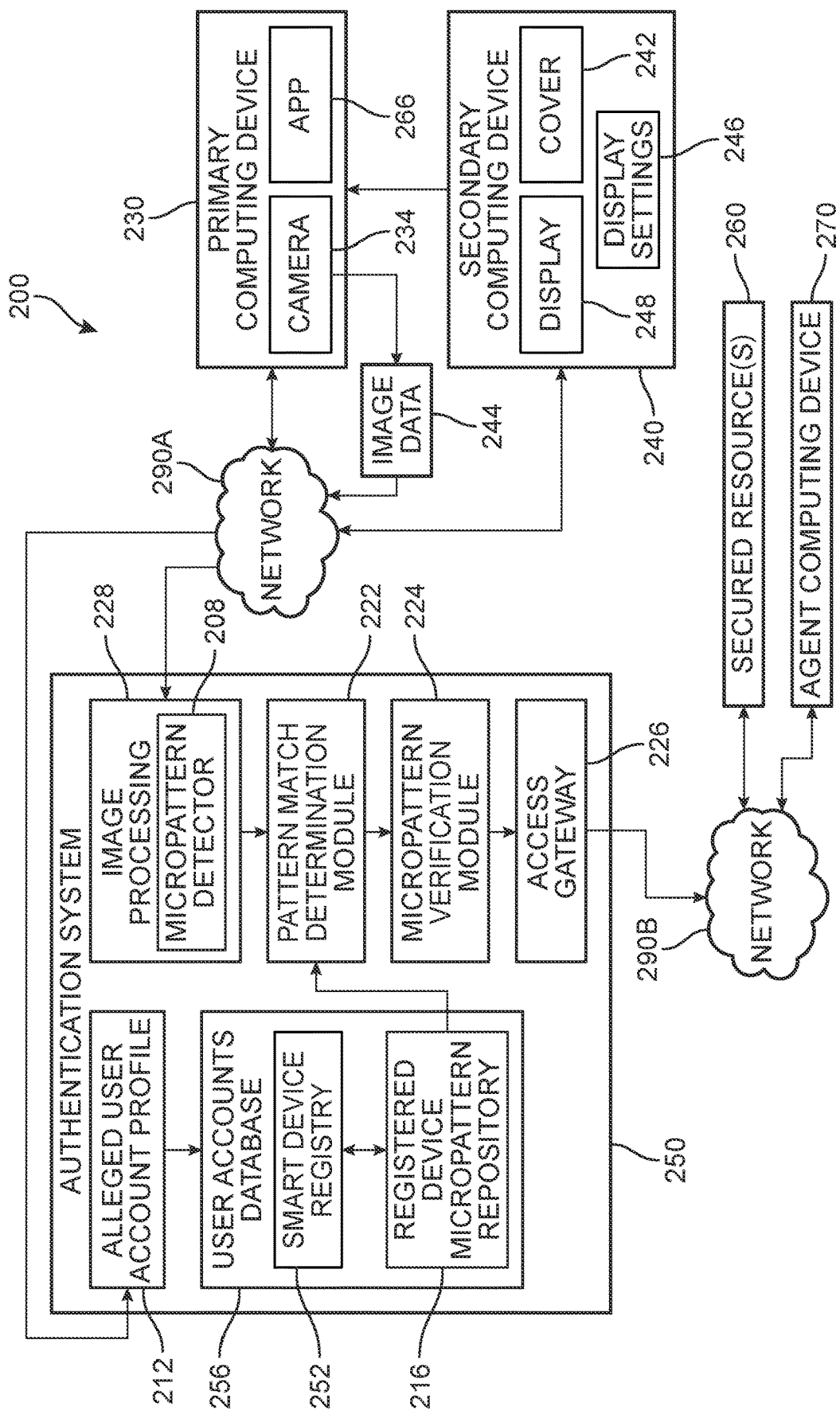
FIG. 2 is an overview of an environment of a micropattern detection-based access system, according to an embodiment.

In order to provide the reader with a greater appreciation of the embodiments, FIG. 2 depict an overview of an embodiment of an access management environment 200. The environment 200 is configured to obtain image data which is used to determine an authenticity of the video. It should be understood that the environment 200 is presented is for purposes of illustration only, and other embodiments may utilize different or additional components or processes. The environment 200 may alternatively include additional, fewer, or different components. For example, the environment may include additional storage devices, additional servers, additional computing devices, and other features not shown in FIG. 2.

In different embodiments, environment 200 can include an authentication system ("system") 250, a secondary computing device ("secondary device") 240, the primary computing device ("primary device") 230, and optional agent computing device ("agent device") 270. Devices and components of second environment 200 can communicate with each other and with other components of second environment 200 over one or more networks (shown here as 290A and 290B, and referred to collectively as 290). The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries.

In different embodiments, agent device 270, secondary device 240, primary device 230, and system 250 can be configured to work in conjunction with a telephony/video-conferencing application ("application" or "app") such as a teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™), internet based meetings (e.g., WebEx™), custom call-center systems, and other conference call systems. In addition, application can be configured to present various interfaces by which administrator or other users can interact with features of system 250. In this case, primary device 230 includes or has access to an app 266 through which a user can conduct communication sessions with a remote agent.

In different embodiments, the system 250 is capable of communicating with external devices such as agent device 270 (also referred to herein as an administrator computer), the primary device 230 (also referred to herein as the image capture device), and the secondary device 240 (also referred to herein as the verification device) through the network 290 using wired or wireless communication capabilities. The system 250 can be understood to comprise a cloud-based server and, along with the agent device 270, may include computing devices comprising any number of components, such as a Network Interface Card (NIC), allowing the respective devices to receive, transmit, process, and store information obtained from the image capture devices. In other words, the environment 200 may include groups or subgroups of computing devices that can communicate with each other, but not necessarily with the computing devices in other groups or subgroups. The environment 200 may include computing devices of disparate types, having different types of hardware and software configurations and in a variety of different locations. In some cases, multiple devices or subsystems can be identified together as a single computing device.

The system 250, agent device 270, primary device 230, and/or secondary device 240 may each include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, smart watches, smart glasses, smart jewelry, smart apparel, laptops, notebooks, tablets, and others, and can include work stations, mainframes, non-portable computing systems, devices installed in structures, vehicles, and other types of installations.

Although not shown in FIG. 2, it should be understood that a virtual or human support agent can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, for example, the agent device can be connected to or include an internet customer interface for providing support specifically to customers or members who contact them via the Internet. As a general matter, support agent can refer to any person or personnel who offers the caller (or person who was called) assistance, and has access to features of the system 250 during the communication session with the customer.

In different embodiments, the system 250 includes or is configured to access one or more databases, such as member profile or a user accounts database 256, and a smart device registry 252. The user accounts database 262 is a content library that stores account data related to one or more users. The data may include, for a plurality of users, name, personal and professional details, user preferences, current and past policy for the user, credit limit of users, among other details. The smart device registry 252 stores description information for known (registered) user devices for which the user has authorized to be used as a verification device and has had the specialized screen cover applied. In one embodiment, the registry maintains a listing of one or more smart devices for each end-user subscribed to the authentication feature.

In some embodiments, an account for the customer verifying their identification credentials can also be linked to the customer's smart device at or around the time of enrollment with the authentication system. Thus, a verification process may occur in conjunction with the collection of the initial smart device listing for that user, whereby the participant presents identity documents that can be used to confirm the user's identity. Furthermore, in different embodiments, the system 250 includes or has access to a registered device micropattern repository 216. In some embodiments, the repository 216 may store image and/or light patterns that are linked to the user and a specific device associated with the user. The user identity can then be linked to the identified smart device and corresponding micropattern in the user's record.

During the communication session between the participant and the agent or other aspect of the system, control signals such as a data capture signal may be transmitted from the authentication system. The data capture signal is configured to instruct primary device 230 to cause an image capture device ("camera") 234 of the primary device 230 to capture image data 244 at the participant's location. The authentication system can use the image information to determine if a token is present using edge detection, infrared imaging, or other known means for identifying areas of interest. For example, the camera 234 can identify a device display (typically rectangular in shape) as an area of interest, separate from a background, using edge detection techniques. The camera 234 can also display an outline on the user's primary computing device with instructions prompting the user to place the secondary device 240 (as the area of interest) inside the outline, and to indicate when the device is there. For example, the display could present a rectangular outline and ask the user to "please align the rectangle with the secondary computing device."

In some embodiments, camera 234 is equipped to capture IR and/or UV image data. In other words, the camera 234 includes an ultraviolet light imaging module and/or an infrared light imaging module, and a visible light imaging module. Each of camera modules may include optical elements arranged to guide, focus, filter and/or otherwise direct light onto one or more photosensitive components. In different embodiments, an ultraviolet (UV) camera module may, for example, be a corona detection imaging system or a solar-blind UV camera module with a high sensitivity silicon imaging sensor such as an electron multiplied charge-coupled-device (CCD) sensor or a scientific complementary metal oxide semiconductor (sCMOS) sensor (as examples). The imaging sensor may be processed so as to have enhanced responsivity in a portion of the UV region of the electromagnetic spectrum such as the UVc band (e.g., between 100 and 280 nanometers) to reduce the solar background for daytime imaging, as well as the anthropogenic background of near-UV, visible and infrared wavelengths that contribute to the background seen by a silicon sensor. The enhanced UVc quantum efficiency of UV camera module can be implemented by using, in some embodiments, back-thinning processes, backside illumination arrangements, and/or coating the sensor with a wave-shifting coating that converts UVc wavelength light to visible wavelengths where the inherent quantum efficiency of a silicon sensor is higher. An imaging sensor based on gallium nitride (GaN) detectors may, in some embodiments, include avalanche photodiode detectors to provide increased signal gain. In one embodiment, GaN detectors may be coupled to a relatively low noise readout integrated circuit (ROIC) (e.g., a ROIC having relatively small integration capacitors in comparison with conventional readout integrate circuits) that allows relatively high signal gain to be used without undesirably increasing readout noise. GaN detectors may be operated using an operating voltage that is relatively high compared to other types of focal plane arrays (e.g., InGaAs focal plane arrays) due to the relatively high bandgap energy of GaN detectors. In one embodiment, the UV camera module may also include a bandpass filter that transmits UVc radiation and rejects other wavelengths of light such as light having wavelengths longer than ~290 nm.

In addition, an infrared (IR) camera module may include any type of infrared camera adapted to detect infrared radiation and provide representative data and information (e.g., infrared image data of a scene). As examples, IR camera module may represent an infrared camera, a dual band imager such as a night vision imager that operates to sense reflected visible, near infrared (NIR), and/or short-wave infrared (SWIR) light for high resolution images and/or mid-wave infrared (MWIR) light, and/or long-wave infrared (LWIR) radiation for thermal imaging, or an imager for sensing both short wave and long wave radiation simultaneously for providing independent image information. In one embodiment, the IR camera module may be a thermal imaging camera module that includes one or more image detector elements such as infrared photodetector elements (e.g., any type of multi-pixel infrared detector, such as a focal plane array) for capturing thermal image data such as infrared image data (e.g., still image data and/or video data) representative of a scene. Furthermore, in different embodiments, the camera 234 may include an illumination source that is used to generate visible and/or infrared light and/or blacklight to illuminate a portion of a scene for imaging. Thus, the camera 234 can acquire visible as well as UV and/or IR light image information.

As noted earlier, in some embodiments, image data capture is configured to occur in response to a data capture control signal generated by the authentication system. In some embodiments, the data capture control signal is automatically produced by the authentication system 250 in response to a selection or request by the user for access to a secured resource requiring additional verification. In another embodiment, the agent can initiate the data capture manually, for example in a case where video or other forgery is suspected during the call.

In different embodiments, the system can include provisions to ensure or otherwise facilitate the capture of output produced from secondary device 240 by camera 234 of primary device 230. In one embodiment, the agent, via agent computing device 270, can request (via message or voice) that the user move the secondary device into the field of view of the camera 238. It can be appreciated that in some embodiments, the user's face will have been detected during the communication session and can serve as a preliminary authentication credential. This may happen before or during the authentication procedure. In other words, the person's face can be captured and compared with reference face data stored in the user's profile to determine if there is a match. However, while such a process is helpful, it is increasingly insecure or unreliable due to the proliferation of deep fake technologies and other image-based forgeries. In order to address this threat, the system is configured to obtain image data 244 of the user's known (pre-registered) secondary device 240 and capture the micropattern output, thereby proving the video is authentic.

In different embodiments, the system can be configured to automatically detect the presence of the secondary device 240 during a video session with the user, and generate guidance to the user via app 266 to move the secondary device 240 into a position that optimizes the image capture of the secondary device display. For example, in cases in which the secondary device is a smartwatch, as a user moves their wrist into the field of view of the camera, the app 266 can determine a portion of the display 248 is obstructed or unclear, and request that the user turn their wrist in a particular direction to better 'see' the display 248. In another example, the secondary device 240 may be out of range of a field of view of camera 234, and the system can automatically present a request to the user to move the designated secondary device 240 into the camera's field of view. In one embodiment, the system will show the user, on a display for the primary device 230, the image data being recorded so that the user can move to accommodate the view of the camera.

In different embodiments, image signal processing algorithms and/or software (e.g., image processing module 228) may reside in primary device 230, system 250, agent device 270, and/or other devices of environment 200 for pre-processing and processing of the captured image data 244. For example, the image input can be cleansed and normalized by the image processing module 228. In FIG. 2, the image processing module is shown as a component of the system 250. In different embodiments, various image processing algorithms and/or software may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

In some embodiments, machine learning techniques, such as deep learning that includes classification, clustering, and/or other techniques, are trained to detect the specific patterns that may be presented or produced to represent the visual or haptic signal received, and are then captured in the image data. Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different pattern types. Some suitable artificial intelligence software is available for public access through open-source AI platforms like Caffe, Torch and Theano who provide businesses access to powerful neural networks for processing of their information by AI techniques like deep learning, reinforcement learning and logistic regression, as well as TensorFlow, OpenAI, and BigSur.

In one embodiment, the image processing module 228 can classify objects in the image data to determine which image segment represents the secondary device. Once the secondary device is identified, the appearance of the display of the secondary device is demarcated and evaluated. In one embodiment, a micropattern detector 208 of the system 250 can receive the segment of the processed image content that includes the display screen and extract or isolate the pattern shown (if any). This extracted content is then sent to a pattern match determination module 222 of the system 250. In some embodiments, the system 250 is configured to compare the image segment corresponding to the display of secondary device in the image data 244 against the user's reference micropattern (i.e., the micropattern that was previously linked to the user for this device). If the patterns match within certain parameters, the user is deemed to pass the authentication or verification test, indicating with a high likelihood that the user is indeed the account holder or other authorized person.

In some embodiments, the image data 244 is processed and models or representations of the image are built. These models are compared against one another. In different embodiments, one or both samples may be deemed unacceptable or unusable if the image is too bright or too dark, or if there is too much noise (poor signal to noise ratio). If a sample is not acceptable the system may request an additional or further sample and again trigger generation of visual and/or haptic indicators from the smart device (either the same signal or a different/new signal).

If the image data is acceptable or sufficient, a scoring occurs via the pattern match determination module 222. The scoring process is analogous to "what is the probability that the pattern captured by the primary device are the same as the verification reference sample that is stored in the registered device micropattern repository 216 for this user?" Thus, in some embodiments, the determination of a "match" is not necessarily based on the verification/reference sample directly or exactly matching the content of the image sample, but rather on the two samples being substantially similar or sharing particular features. The returned score is evaluated against a threshold value to determine if it meets or exceeds the minimum acceptable score by micropattern verification module 224. If the score is determined to be successful (greater than some pre-selected threshold), the system 250 and/or agent may allow a user to proceed further to access secured resource(s) 260.

In one example, the micropattern verification module 224 can verify that the two patterns are a sufficient match and transmit a signal to an access gateway 226, which will route the user to the appropriate resource 260. For example, within a call center or telephone banking menu system, secured resource 260 can represent private data and/or controls being safeguarded by the service provider. In other embodiments, micropattern verification module 224 can be configured such that the pattern detected (if any) from the captured images must directly correspond to the pattern in the repository 216 in order for a match decision to occur.

Once the data samples are compared by the pattern match determination module 222, and if a match is found that is in an acceptable range by the verification module 224, the access to secured resource(s) 260 by the user will be allowed and/or enabled by access gateway 224. Otherwise, access is denied, or blocked pending further verification. In some embodiments, the system is configured to then automatically generate a message indicating an unauthorized attempt to access the secured resource may have occurred. In some embodiments, this message can be automatically transmitted by the platform to the second computing device or account address for the registered user.

It can be appreciated that authentication based on verification of the user's possession of secondary device 240 with the correct micropattern strongly implies that the user's identity is true and correspondingly is in fact entitled to whatever access is being requested. It should be understood that while the system 250 bases access decisions at least in part on the detection of the designated micropattern, in some embodiments, the system is further configured to first confirm that the user ID and optional password match based on information available in the user accounts database 256.

Alternatively, or additionally, the micropattern itself can include characteristics or features that provide the data necessary to authenticate the user. For example, in different embodiments, the micropattern represents or corresponds to an encoded physical medium that will include identifier data. For purposes of this disclosure, a cloaked identifier is a type of micropattern in which content is encoded. The encoded content can take any of a variety of forms, dependent upon such things as the encoding scheme and the authentication service provider. The content may include computer instructions, a uniform resource locator (URL), and other user-specific data. In such embodiments, the micropattern verification module 224 is configured to 'read' or otherwise decode the data carried via the micropattern. This data can be compared to the data for the user stored in a record in user accounts database 256. If the decoded data aligns with the user data, verification module 224 may allow a user to proceed further within a call center or telephone banking menu system or other secured resource being safeguarded by the service provider, for example via access gateway 292.

In other words, if the image data includes a micropattern with an appearance that matches the micropattern stored in accounts database 256 within certain parameters, or if the image data includes a micropattern that carries a specific type or set of data that can be used to identify the accountholder, the user is deemed to have passed the authentication test, which indicates with a high likelihood that the user is indeed the account holder or other authorized person. Access can then be automatically granted, or the process can serve as a supplementary security measure along with conventional security identifiers.

Figure 3:
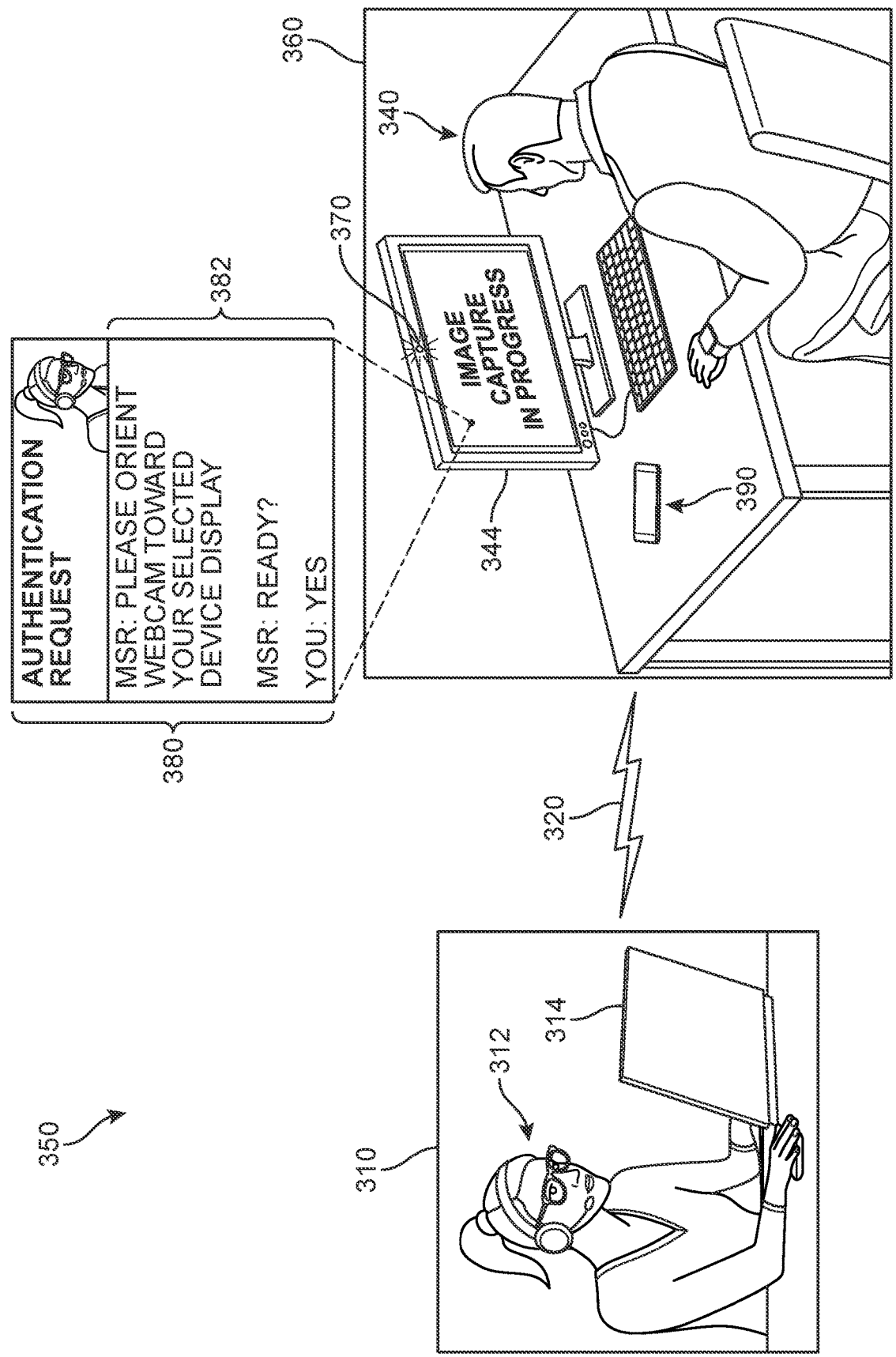
FIGS. 3, 4, 5A, 5B, and 6 are a sequence of drawings depicting an example in which a person is engaged in a video communication session with a service representative and is seeking access to a secured resource based on the presence of a specific micropattern, according to an embodiment.

Referring now to FIGS. 3-6, an example of an authentication scenario occurring during a communication session 350 between a second user 340 and an agent 312 is depicted. In FIG. 3, the second user 340 is, via a first computing device ("first device") 344 at a remote location 360, interacting with the access management service and communicating with an agent 312 via network 320. The first device 344 represents the second user's primary computing device in this scenario. The second user 340 also has a mobile phone 390 which serves as his secondary computing device. The agent 312 is communicating with second user 340 via a third computing device ("third device") 314 located at a site 310 such as a call center or other business.

For purposes of this example, the second user 340 has requested access to secured resources associated with a user account managed by the entity which agent 312 is representing. In this case, a first user interface ("first interface") 380 provides a first chat window 382 to allow the second user 340 to partake in an instant messaging session with the second agent 312 ("Authentication Request-MSR: Please orient webcam toward your selected device display/MSR: Ready?/YOU: Yes"). In other embodiments, the communication can occur in part or fully via a video conferencing interface whereby the agent 312 and second user 340 speak in real-time over a video screen. Once the second user 340 provides his consent, an image capturing event is automatically triggered by the system or initiated by the agent 312, and image data collected by an image sensor ("camera") 370.

As shown in FIG. 3, in different embodiments, a user can communicate via an interface generated by a communications application. The application can offer a user interface that may be accessed via any user computing device configured for connection to a network. In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video or other media associated with a user interface, or other such information presentation.

Figure 4:
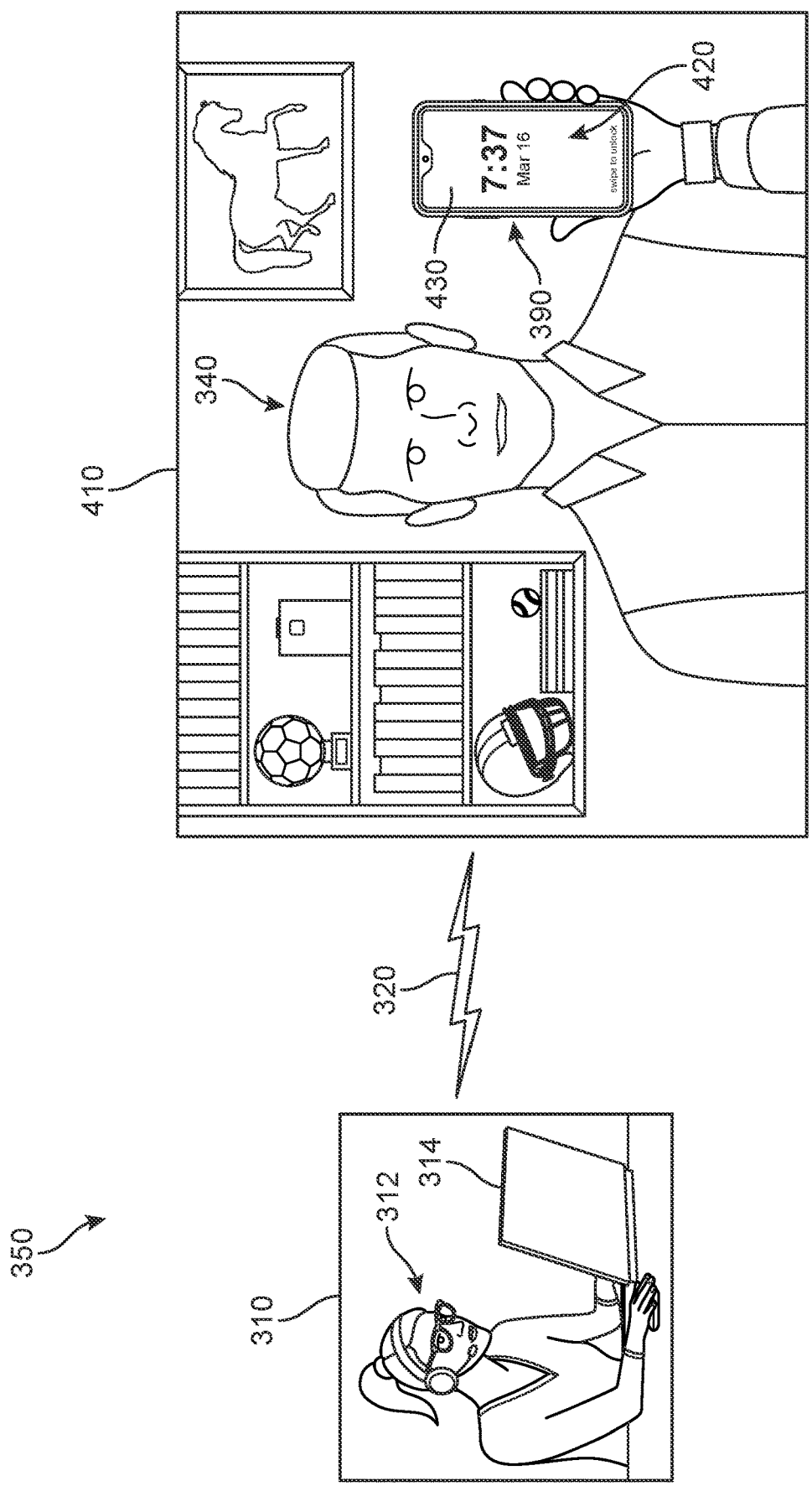

In FIG. 4, a depiction of first image data 410 as viewable by the system and/or agent 312 at the third device 314 via network 320 is shown. The second user 340 has positioned himself in front of a camera for the first device (see FIG. 3). In addition, per the authentication request, the second user 340 moves in order to adjust the pose of his mobile phone 390 (secondary device) to be presented in the field of view of the camera for the user's primary computing device (see FIG. 3). In some embodiments, the agent and/or system can request that a screen 420 for the mobile phone 390 faces toward the camera, as shown in FIG. 4. This allows any pattern or information that is presented on screen 420 (i.e., through a screen cover 430) to be in the field of view of the camera. For purposes of this disclosure, a pose refers to an object's estimated position and orientation in three dimensions, where position may be specified by linear measurements with respect to orthogonal 3D axes such as X, Y, and Z, and orientation may be specified by angular measurements around the 3D axes, such as by the angles $\theta_x$, $\theta_y$, and $\theta_z$, corresponding to angular measurements with respect to the X, Y, and Z axes, respectively. A pose may be indicated or specified by the vector [X, Y, Z, $\theta_x$, $\theta_y$, $\theta_z$].

Figure 5A:
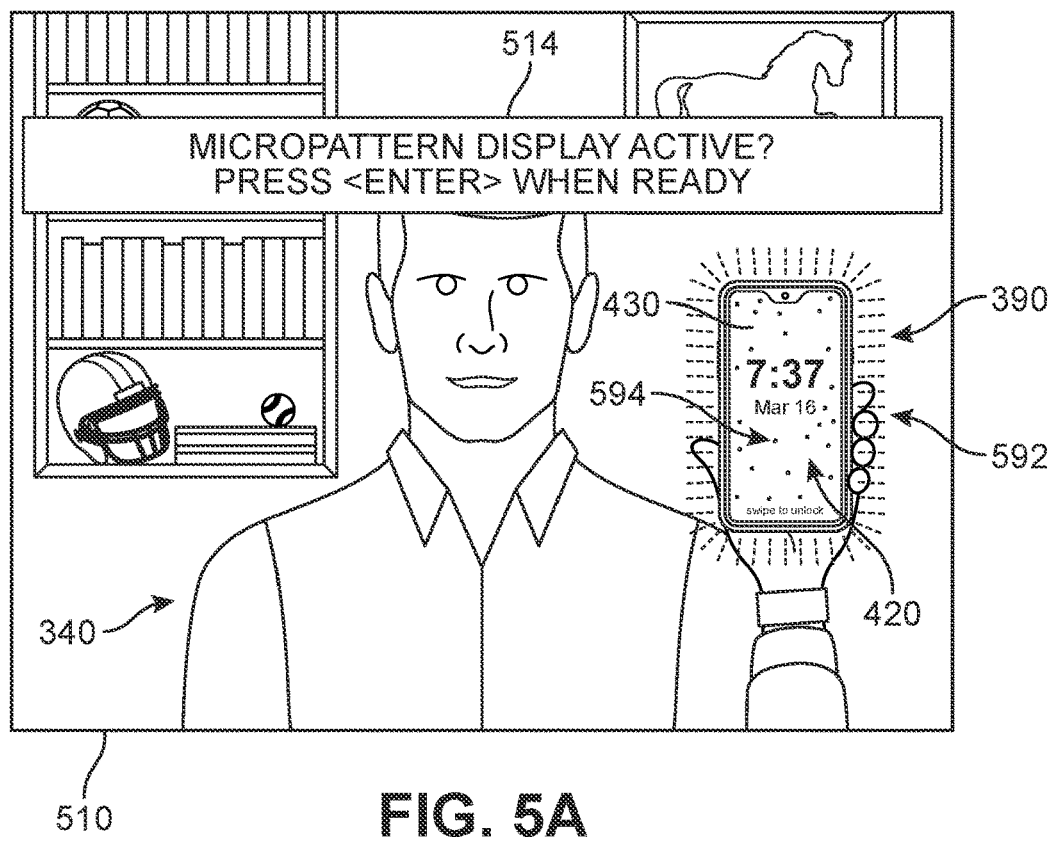
Figure 5B:
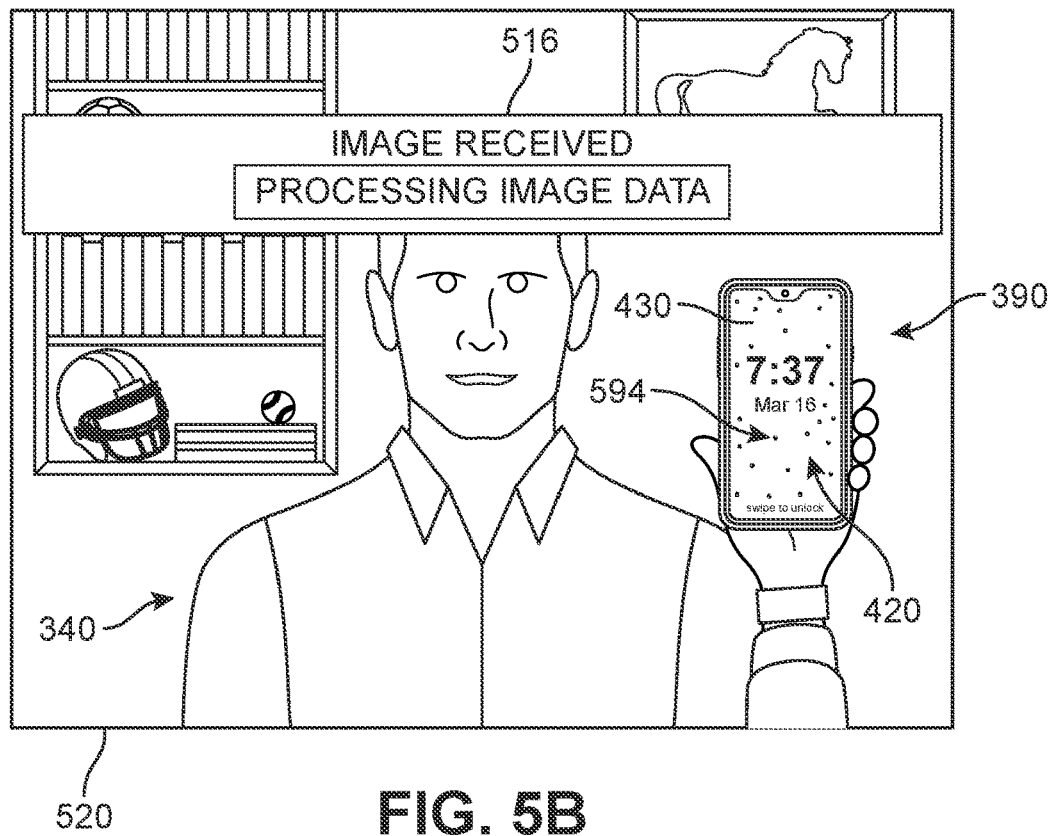

In FIG. 5A, a depiction of second image data 510 (captured subsequent to the capture of the first image data 410 of FIG. 4) as received by the system is shown. In some embodiments, first image data and second image data represent substantially consecutive frames for a video recording that is being streamed to the system, while in other embodiments, each corresponds to a static image captured at different points in time (photographs). A first authentication message 514 ("Micropattern display active? Press <ENTER> when ready") can be optionally presented to the second user 340 to remind them to enable display settings that cause the pattern in the screen cover to be revealed. For purposes of this example, the user has increased a brightness level 592 of their screen 420 to a maximum level. In response, the previously hidden or otherwise invisible pattern of micro-holes formed in the display cover 430 become visible as a unique arrangement of pinpoint light, providing a micropattern 594. In FIG. 5B, a depiction of third image data 520 (captured subsequent to the capture of the second image data 510 of FIG. 5A) as received by the system is shown. The system initiates processing of the image data, as indicated by a second status message 514 ("Image received. Processing image data"). The micropattern 594 is isolated and used to verify the second user 340 as described above with respect to FIG. 2.

In different embodiments, an image classifier can receive the image data and automatically detect the presence of the display for the secondary device. In some embodiments, the configuration of the secondary device (e.g., the size, shape, type, model, etc.) is known to the system, obtained during enrollment and registration of the secondary device in the user profile. The micropattern detector determines whether the secondary device has presented and/or produced the correct pattern per the stored reference pattern, or if the micropattern can be decoded to verify the user's identity.

Figure 6:
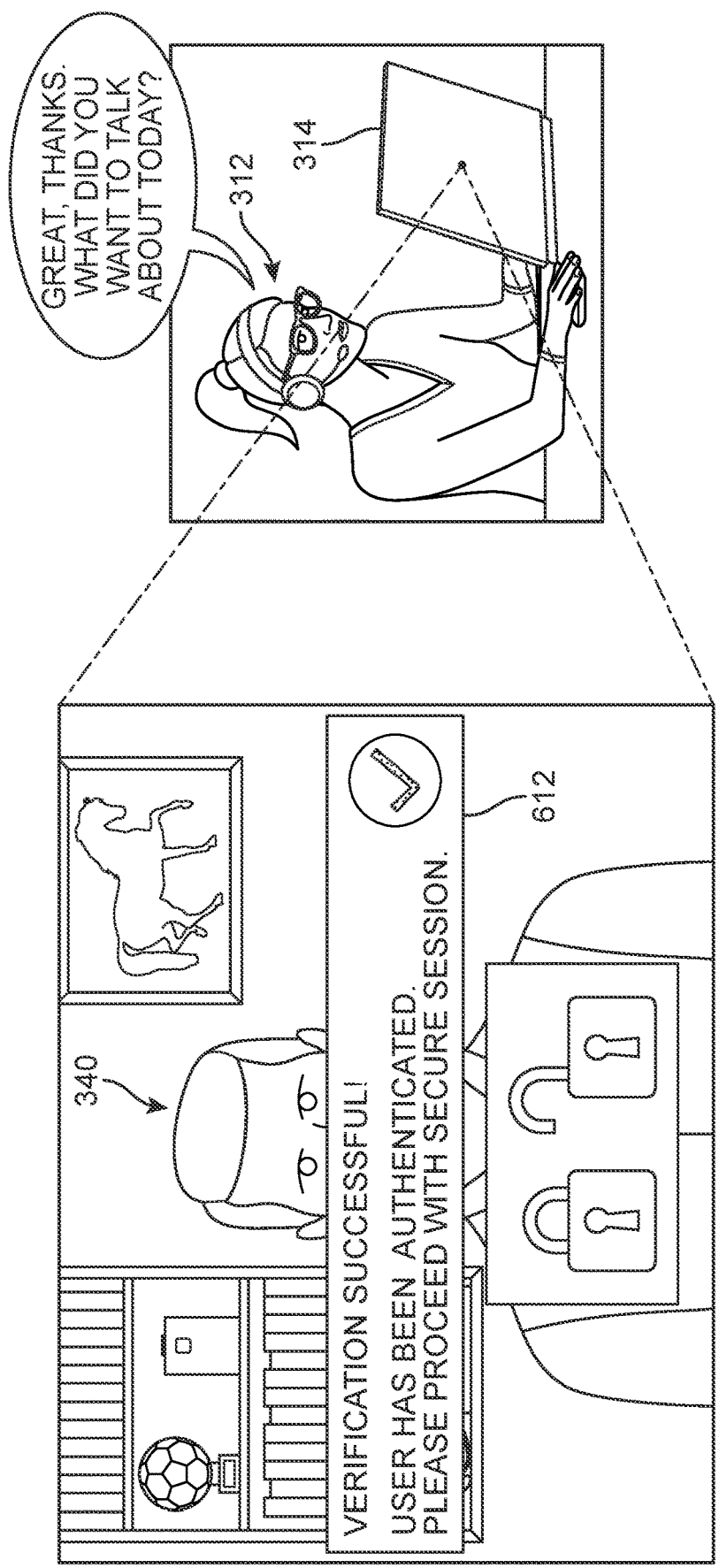

In FIG. 6, the patterns have been determined to be similar enough so as to be classified as a match, as indicated by a third status message 612 ("Verification successful! User has been authenticated. Please proceed with secure session") presented to the agent. The system can then automatically enable or grant the second user 340 to access the secured resource, or the agent can respond to the verification by manually enabling access.

Figure 7:
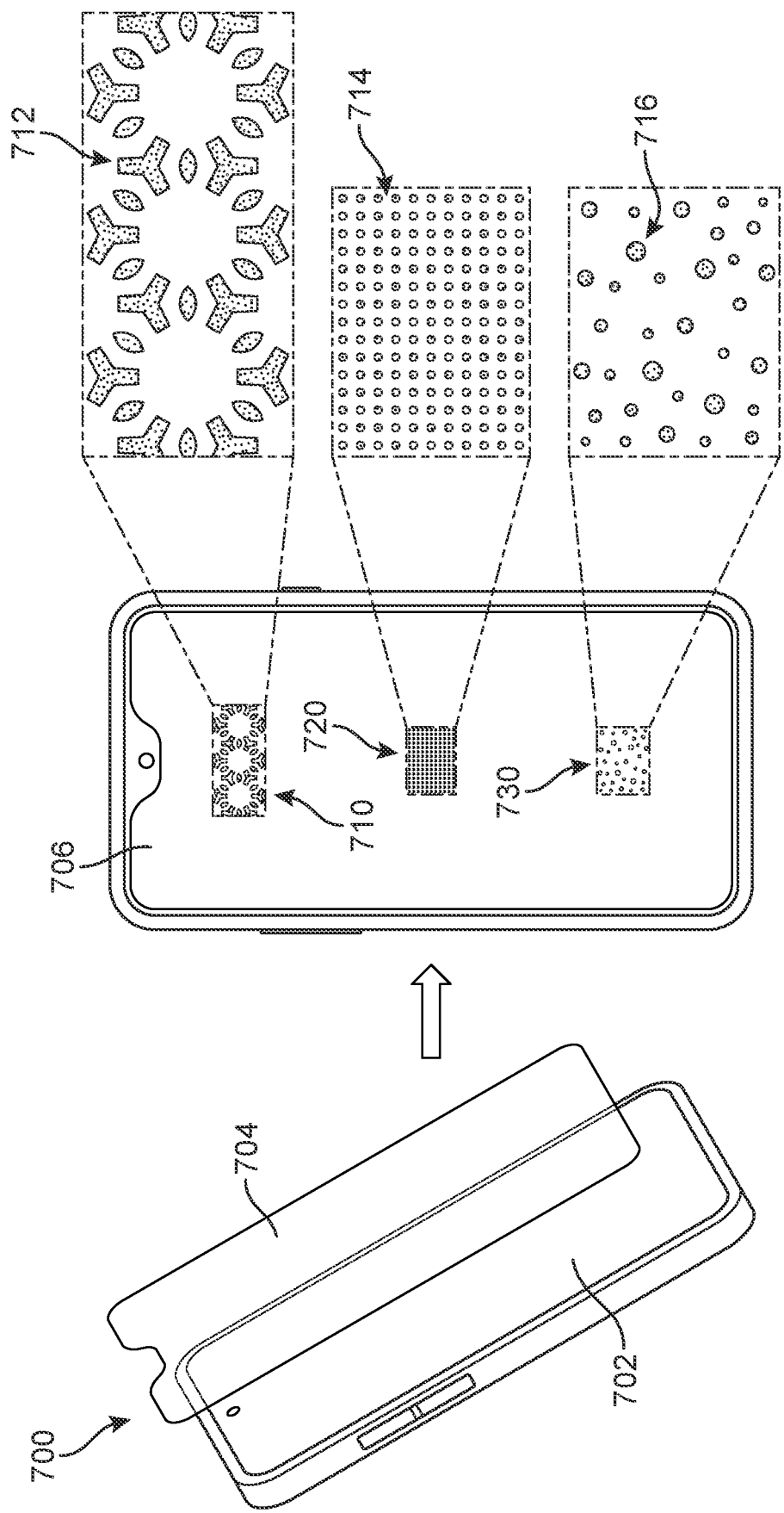
FIG. 7 depicts a kit of parts including a mobile computing device and a screen cover, according to an embodiment.

For purposes of clarity, an example of a screen cover 704 sized and dimensioned for application on a screen 702 for mobile computing device 700 is depicted in FIG. 7. The cover 702 can be applied and appear to be substantially smooth, transparent, and continuous, allowing for normal use of the mobile computing device 700. In some embodiments, the cover 702 is coated or otherwise covered by a substantially transparent paint that is "invisible" in ordinary lighting (or backlighting) conditions. However, the paint is designed to be reactive to certain lighting conditions, such that when exposed to that light source, the cover transitions from transparent mode to a translucent mode or opaque mode. For example, UV backlighting can trigger the appearance of some color that will make the previously "invisible" screen cover become visible. In other embodiments, different triggers can cause the cover to become visible, such as infrared or ultraviolet light. In some embodiments, a cover surface may be printed or otherwise coated in infrared or UV ink. A human eye would not normally be able to see the infrared or ultraviolet ink, but instead would only see a see-through display cover. In some embodiments, the cloaked ink can be selected from one or more of glow-in-the-dark, ultraviolet, infrared, photo-chromatic, hydro-chromatic, and thermo-chromatic ink. In other words, the token would be normally invisible, hidden, or highly obscured, until exposed to a particular light or element or temperature.

Furthermore, as illustrated by the three magnified views of portions of the cover 702, it can be appreciated that a surface 706 of the cover 702 can be fabricated with a plurality of micro-hole-based patterns. In this example, a first portion 710 can be seen to include a first micropattern 712 of ovals and three-pointed star shapes, a second portion 720 has a second micropattern 714 with an array of circular holes of similar size, and a third portion 730 has a third micropattern 716 in which an assortment of differently sized holes is arranged across the surface 706. In some embodiments, the surface 706 can include portions that are smooth (i.e., no pattern), while other neighboring portions include micro-holes. Furthermore, the patterns can comprise holes of varying sizes, shapes, dimensions, and arrangement in order to provide a unique verification token for each end-user. It can be appreciated that these microholes would not be generally noticeable or detectable when the screen cover is in its transparent or "invisible" mode.

Figure 8:
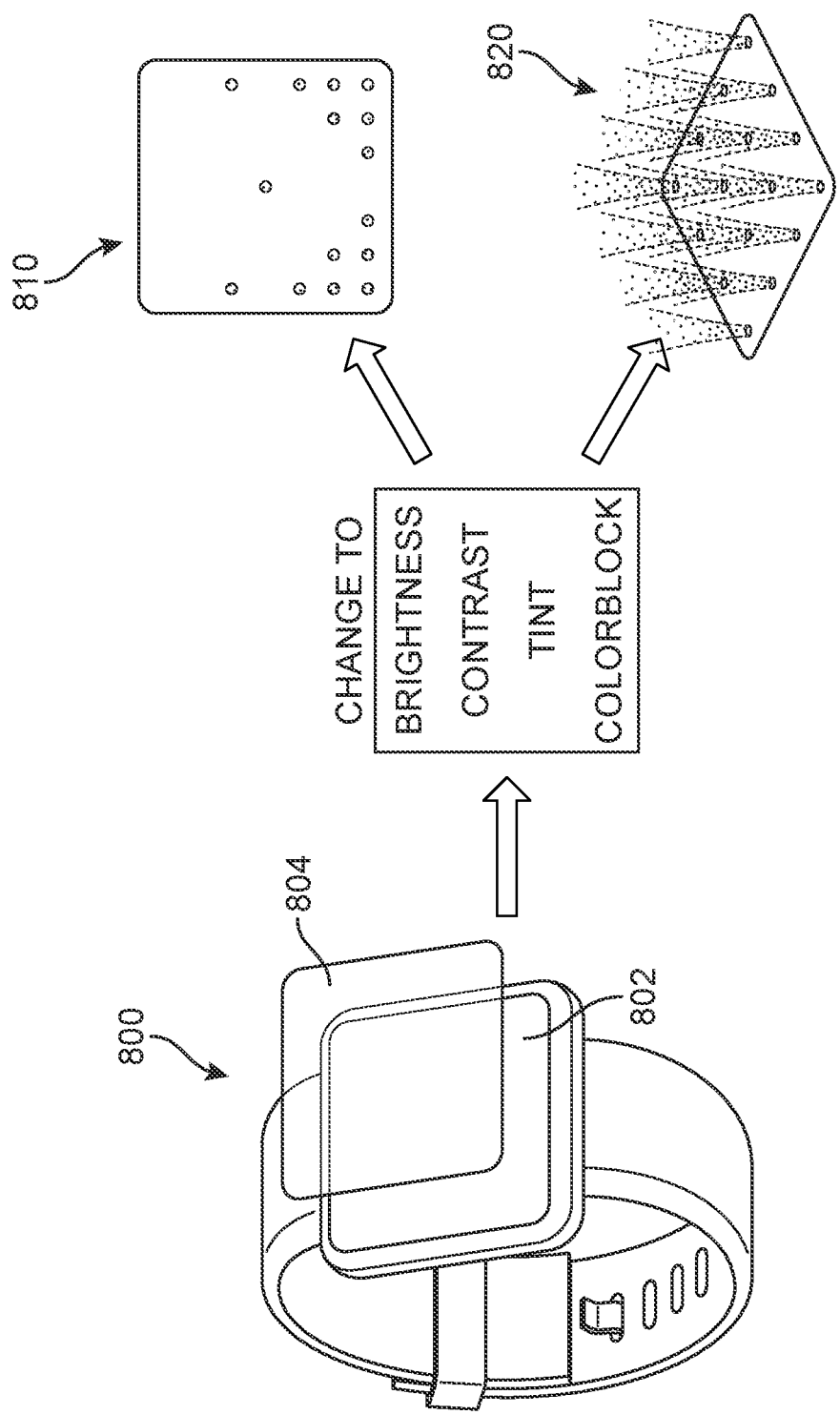
FIG. 8 depicts an example of a smartwatch display change causing a micropattern to be revealed through a screen cover, according to an embodiment.

Another example is presented in FIG. 8, where a cover 804 is being installed or applied on a screen 802 for a smartwatch 800. In different embodiments, the microholes can be configured to have a particular aspect or appearance when different display settings are enabled. In normal use, the microholes will remain substantially concealed. However, when the user causes the display to change in brightness, contrast, tint, etc. or presents a colorblocked background (e.g., solid white, solid orange, etc.), the microholes will become visible as small pinpoints of light, providing a pattern of dots. In some embodiments, the system is configured to require the same display setting change (e.g., a yellow tint) to obtain the specific micropattern that will enable access to their account or otherwise verify their identity. Thus, as one non-limiting example, if the user applies a yellow tint, the resulting micropattern of yellow dots will be accepted. However, if the user applies a green tint, the resulting micropattern of green dots, while disposed in the same arrangement, will not be accepted. In a different example with a different cover, the user may be required to maximize the contrast and/or brightness for the micropattern to be visible and accepted.

Figure 9:
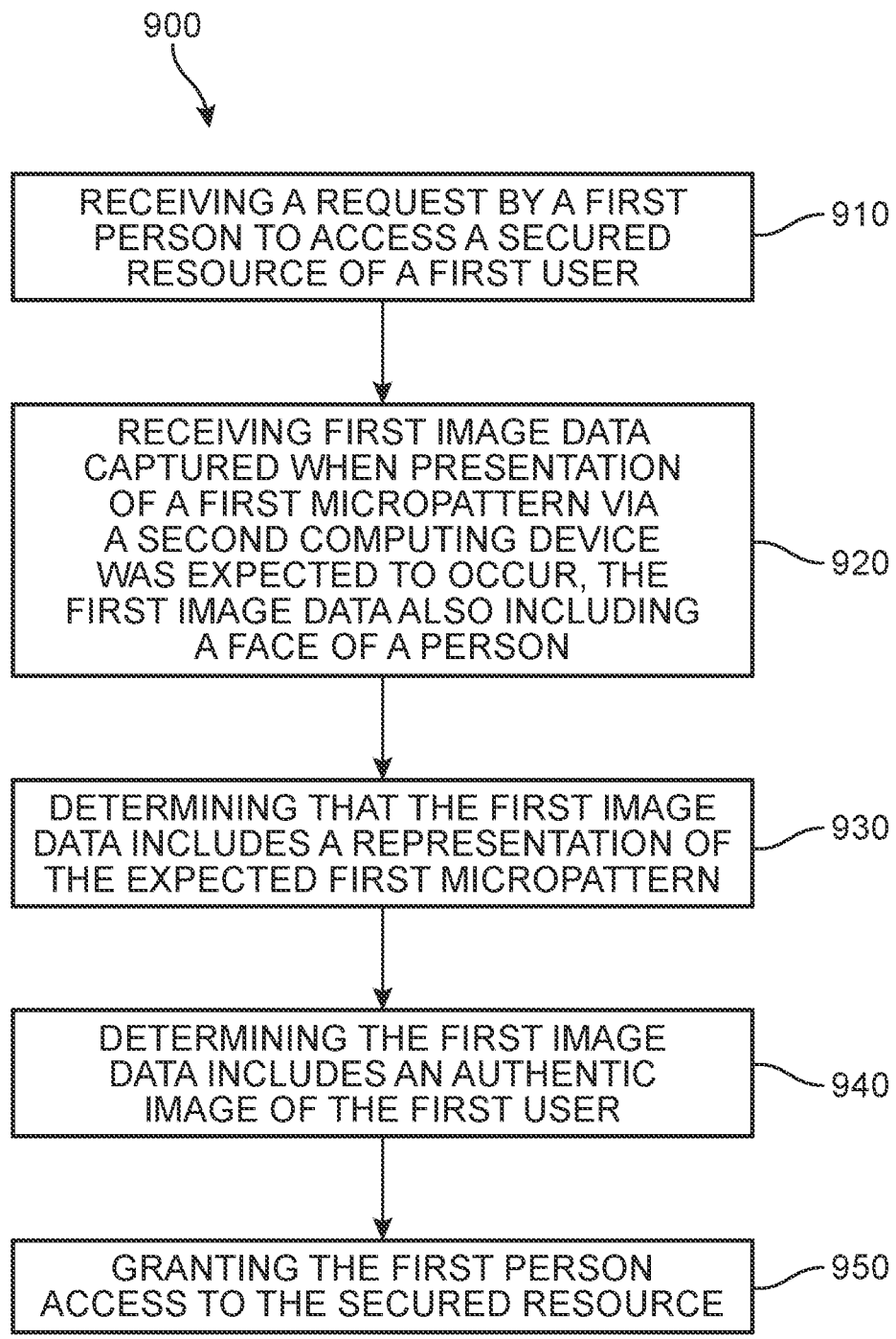
FIG. 9 is a flow chart depicting a process of verifying an authenticity of video in order to protect user resources, according to an embodiment.

FIG. 9 is a flow chart illustrating an embodiment of a method 900 of verifying an authenticity of video in order to protect user resources. The method 900 includes a first step 910 of receiving at a first time, at an authentication system and from a first computing device, a request by a first person to access a secured resource of a first user and a second step 920 of receiving, at the authentication system, first image data captured by a camera of the first computing device when presentation of a first micropattern via a second computing device was expected to occur, the first image data also including a face of a person. The authentication system can be accessed from a remote location, and in some embodiments, reside in a cloud-based server. A third step 930 includes determining that the first image data includes a representation of the expected first micropattern. In a fourth step 940, the method 900 includes determining, in response to the first image data including a representation of the first micropattern, that the first image data includes an authentic image of the first user. Finally, a fifth step 950 includes granting access to the secured resource for which the first user is authorized (in response to the verification) via the first computing device.

In other embodiments, the method may include additional steps or aspects. In one example, the first micropattern is revealed by a backlight of the second computing device when the second device is at a maximum brightness level, and is concealed when the backlight is at a minimum brightness level or off. In other embodiments, the first micropattern is revealed by a backlight of the second computing device when the second device is at or above a 50% brightness level, and is concealed when the backlight is below a 50% brightness level or off. In some embodiments, the method also includes steps of determining the first micropattern is sufficiently similar to a reference micropattern so as to be classified as a match, verifying, in response to the first micropattern matching the reference micropattern, an authenticity of the video, and thereby granting the first person access to the secured resource for which the first user is authorized.

In another embodiment, the method also includes steps of determining, at the authentication system, that the first micropattern includes encoded content, decoding, at the authentication system, the encoded content to obtain decoded content, detecting, at the authentication system, user-specific data associated with the first user in the decoded content, verifying, in response to the user-specific data, an authenticity of the video, and thereby granting the first person access to the secured resource for which the first user is authorized. In some embodiments, the method also includes a step of receiving second image data at a second time earlier than the first time, wherein the second image data includes image content of a display for the second device while the first micropattern was revealed, and the reference micropattern is based on the first micropattern captured in the second image data.

In some embodiments, the method also includes steps of employing, prior to the first time, a verification process to verify that the first user is associated with a first user identity, generating a record that links the second image data to the first user identity, and storing the record in a database accessible by the authentication system. In some examples, the method can also include steps of transmitting, from the authentication system and to the first computing device, a control signal in response to the request from the first person, and causing, via the control signal, the camera to capture an image. In one embodiment, the first image data is obtained during a videoconferencing session between the first user and a service representative associated with the secured resource. In another example, the second computing device is one of a mobile phone and a smartwatch.

In different embodiments, the proposed system can be implemented with various arrangements, as described earlier with respect to FIGS. 7 and 8. As one example, a kit of parts for authentication can include a mobile computing device with a screen, and a substantially transparent first screen cover applied to the screen. The first screen cover includes a plurality of through-hole (extend from one side to the other side) micro-apertures or micro-holes formed in a surface of the first screen cover, the plurality of micro-holes being arranged to provide a first micropattern, and the first micropattern is concealed from human vision when the screen is dark and revealed when the screen is bright. In some embodiments, an image of the screen of the mobile computing device captured when the first micropattern is revealed is used to authenticate a user associated with the mobile computing device. In one example, the first micropattern includes encoded content that can be decoded by an authentication system in order to determine whether to verify a user identity.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both.

In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of verifying an authenticity of video in order to protect user resources, the method comprising:
receiving at a first time, at an authentication system and from a first computing device, a request by a first person to access a secured resource of a first user;

receiving, at the authentication system, first image data captured by a camera of the first computing device when presentation of a first micropattern via a second computing device was expected to occur, the first image data also including a face of a person;

determining that the first image data includes a representation of the expected first micropattern;

determining, in response to the first image data including a representation of the first micropattern, that the first image data includes an authentic image of the first user; and granting access to the secured resource via the first computing device.

2. The method of claim 1, wherein the first micropattern is revealed by a backlight of the second computing device when the second device is at a maximum brightness level, and is concealed when the backlight is at a minimum brightness level or off.

3. The method of claim 1, further comprising:
determining the first micropattern is sufficiently similar to a reference micropattern so as to be classified as a match;
verifying, in response to the first micropattern matching the reference micropattern, an authenticity of the video; and
thereby granting the first person access to the secured resource for which the first user is authorized.

4. The method of claim 1, further comprising:
determining, at the authentication system, that the first micropattern includes encoded content;
decoding, at the authentication system, the encoded content to obtain decoded content;
detecting, at the authentication system, user-specific data associated with the first user in the decoded content;
verifying, in response to the user-specific data, an authenticity of the video; and
thereby granting the first person access to the secured resource for which the first user is authorized.

5. The method of claim 1, further comprising receiving second image data at a second time earlier than the first time, wherein the second image data includes image content of a display for the second device while the first micropattern was revealed, and the reference micropattern is based on the first micropattern captured in the second image data.

6. The method of claim 5, further comprising:
employing, prior to the first time, a verification process to verify that the first user is associated with a first user identity;
generating a record that links the second image data to the first user identity; and
storing the record in a database accessible by the authentication system.

7. The method of claim 1, further comprising:
transmitting, from the authentication system and to the first computing device, a control signal in response to the request from the first person; and
causing, via the control signal, the camera to capture an image.

8. The method of claim 1, wherein the first image data is obtained during a videoconferencing session between the first user and a service representative associated with the secured resource.

9. The method of claim 1, wherein the second computing device is one of a mobile phone and a smartwatch.

10. A system for verifying an authenticity of video in order to protect user resources, the system comprising a processor and machine-readable media including instructions which, when executed by the processor, cause the processor to:

receive at a first time, at an authentication system and from a first computing device, a request by a first person to access a secured resource of a first user;

receive, at the authentication system, first image data captured by a camera of the first computing device when presentation of a first micropattern via a second computing device was expected to occur, the first image data also including a face of a person;

determine that the first image data includes a representation of the expected first micropattern;

determine, in response to the first image data including a representation of the first micropattern, that the first image data includes an authentic image of the first user; and grant access to the secured resource via the first computing device.

11. The system of claim 10, wherein the first micropattern is revealed by a backlight of the second computing device when the second device is at a maximum brightness level, and is concealed when the backlight is at a minimum brightness level or is off.

12. The system of claim 10 wherein the instructions further cause the processor to:
determine the first micropattern is sufficiently similar to a reference micropattern so as to be classified as a match;
verify, in response to the first micropattern matching the reference micropattern, an authenticity of the video; and
thereby grant the first person access to the secured resource for which the first user is authorized.

13. The system of claim 10, wherein the instructions further cause the processor to:
determine, at the authentication system, that the first micropattern includes encoded content;
decode, at the authentication system, the encoded content to obtain decoded content;
detect, at the authentication system, user-specific data associated with the first user in the decoded content;
verify, in response to the user-specific data, an authenticity of the video; and
thereby grant the first person access to the secured resource for which the first user is authorized.

14. The system of claim 10, wherein the instructions further cause the processor to receive second image data at a second time earlier than the first time, wherein the second image data includes image content of a display for the second device while the first micropattern was revealed, and the reference micropattern is based on the first micropattern captured in the second image data.

15. The system of claim 14, wherein the instructions further cause the processor to:
employ, prior to the first time, a verification process to verify that the first user is associated with a first user identity;
generate a record that links the second image data to the first user identity; and
store the record in a database accessible by the authentication system.

16. The system of claim 10, wherein the first image data is obtained during a videoconferencing session between the first user and a service representative associated with the secured resource.

17. The system of claim 10, wherein the instructions further cause the processor to:

transmit, from the authentication system and to the first computing device, a control signal in response to the request from the first person; and cause, via the control signal, the camera to capture an image.

18. A kit of parts comprising:

a mobile computing device with a screen; and a substantially transparent first screen cover applied to the screen, the first screen cover including a plurality of micro-holes formed in a surface of the first screen cover, the plurality of micro-holes being arranged to provide a first micropattern, wherein the first micropattern is concealed from human vision when the screen is dark and revealed when the screen is bright.

19. The kit of parts of claim 18, wherein an image of the screen of the mobile computing device captured when the first micropattern is revealed is used to authenticate a user associated with the mobile computing device.

20. The kit of parts of claim 18, wherein the first micropattern includes encoded content that can be decoded by an authentication system in order to determine whether to verify a user identity.

* * * * *